United States Patent [19]

Villette

[11] 4,280,156
[45] Jul. 21, 1981

[54] LIGHTLY LOADED RAMP-LAUNCHED READ/WRITE DEVICE FOR A DATA CARRIER

[75] Inventor: Jean Villette, Ollainville, France

[73] Assignee: Compagnie Internationale pour l'Informatique CII-Honeywell Bull (Societe Anonyme), Paris, France

[21] Appl. No.: 18,984

[22] Filed: Mar. 9, 1979

[30] Foreign Application Priority Data

Mar. 24, 1978 [FR] France ............................ 78 08616

[51] Int. Cl.³ .......................... G11B 5/48; G11B 5/54; G11B 21/02
[52] U.S. Cl. .................................... 360/105; 360/75; 360/103
[58] Field of Search ...................... 360/105, 103–104, 360/109, 75

[56] References Cited

U.S. PATENT DOCUMENTS

| | | | |
|---|---|---|---|
| 3,896,495 | 7/1975 | Beecroft | 360/103 |
| 3,956,770 | 5/1976 | McWhinnie et al. | 360/103 |
| 4,017,898 | 4/1977 | Toombs et al. | 360/105 |
| 4,120,010 | 10/1978 | Mitsuya et al. | 360/105 X |

*Primary Examiner*—John H. Wolff
*Attorney, Agent, or Firm*—Kerkam, Stowell, Kondracki & Clarke

[57] ABSTRACT

A ramp-launched read/write device for a data carrier includes an arm, a loading spring having a part fixedly connected to the said arm and a free end part, a platform incorporating at least one read/write transducer, a carrier member to carry the platform, and a guide member for controlling the position of the platform in relation to the data carrier. The guide member is made up of a level surface and at least one ramp, and is arranged to cooperate with the said guide member for bringing the platform to a first, rest position and a second read/write position close to the data carrier to allow the data carrier to be read from or written on. The carrier member includes a suspension spring which has one end fixedly connected to the arm and a free end adapted to contact with the platform. The guide member is fixedly but flexibly connected to the arm and the said free end part of the loading spring contacts the guide member in accordance with the positions of the platform. An antivibration member in the form of a spring has one end fixedly connected to the arm and its free end rests against the free end of the suspension spring of said carrier member. The carrier member is shaped to enable the platform to move between the said first and second positions while remaining parallel to itself. To this end the carrier member includes a frame enclosing the platform which is carried by two substantially parallel arms which bend through approximately 180° before connecting up with the central areas of the carrier.

8 Claims, 7 Drawing Figures

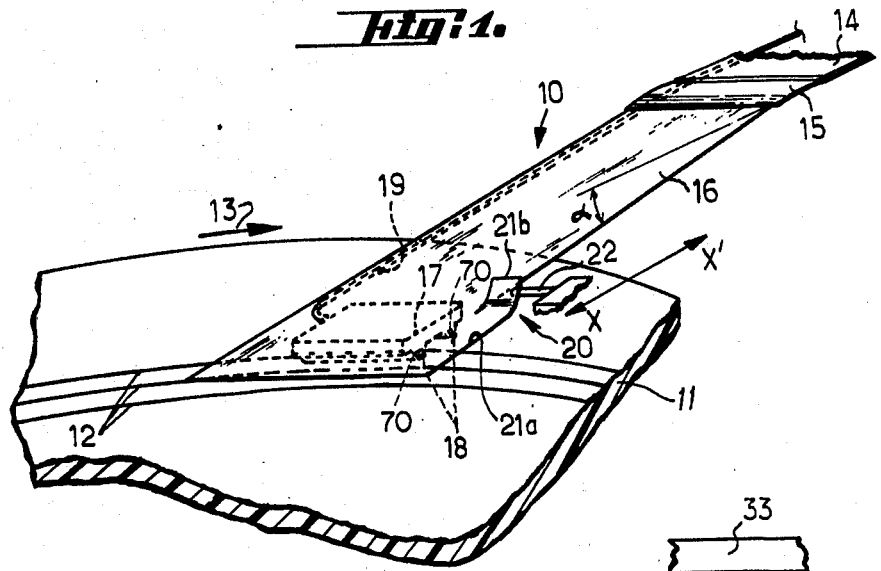
PRIOR ART
Fig. 1.
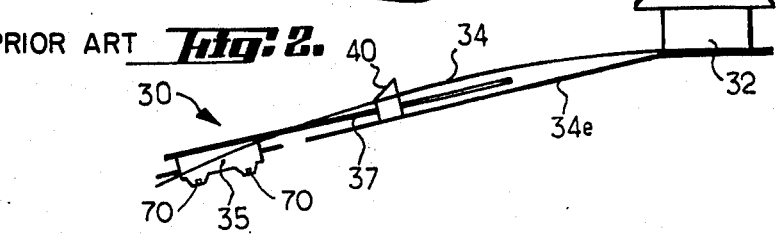
PRIOR ART Fig. 2.
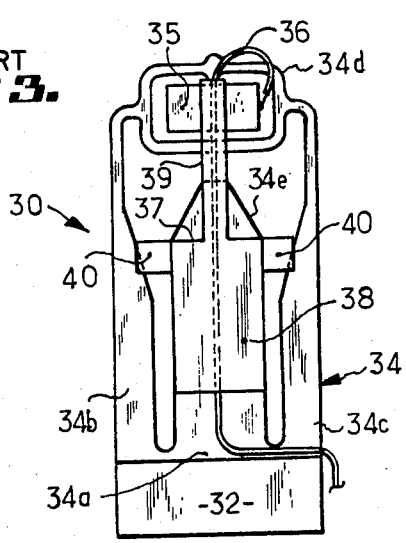
PRIOR ART
Fig. 3.

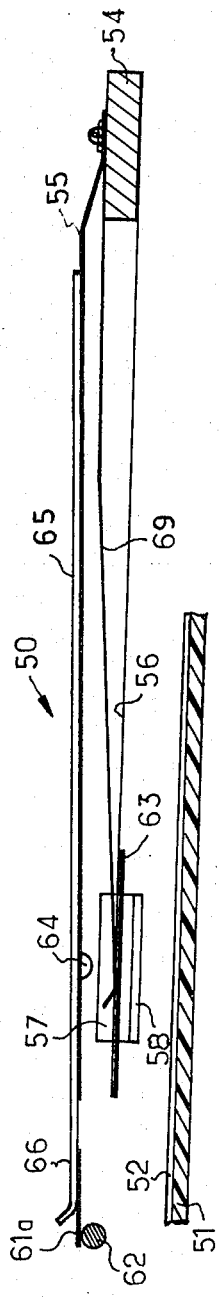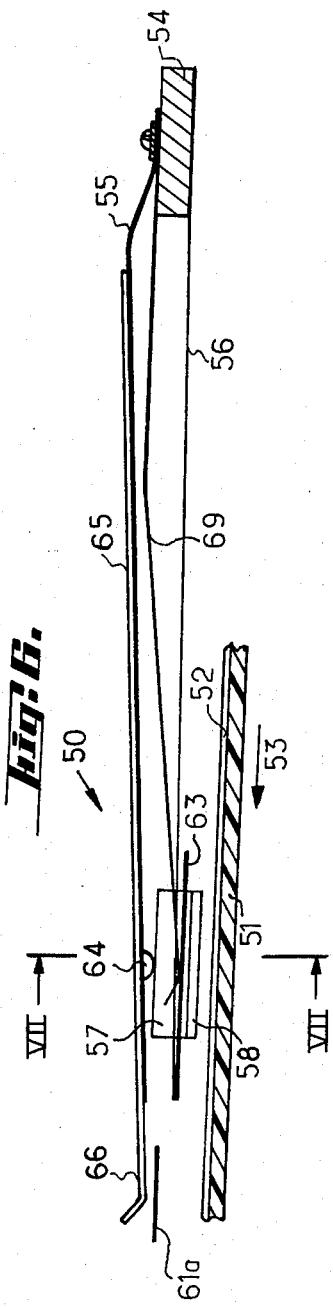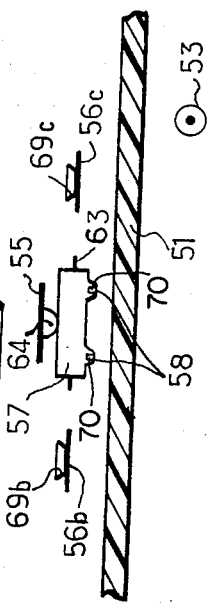

LIGHTLY LOADED RAMP-LAUNCHED READ/WRITE DEVICE FOR A DATA CARRIER

BACKGROUND OF THE INVENTION

1. Field of the Invention

The invention relates generally to read/write devices for data carriers and more particularly to a read/write device of the type which is ramp-launched. It is applicable to magnetic read/write devices for magnetic peripherals of data-processing systems, in particular disc memories.

2. Description of the Prior Art

In present-day data processing systems, increasingly frequent use is being made of magnetic disc memories because of their storage capacity and the relatively short time taken by the magnetic read/write transducers to access an item of data contained anywhere on the discs from the time when the transducers receive an order to access this item from the said processing system.

Magnetic discs are known to carry data in concentric circular recording tracks whose radial widths are in the order of a few hundredths of a millimeter or less and which generally cover the major proportion of both faces of the discs. The discs are driven round at constant speed by an electric motor.

To enable data to be read from and written onto disc memories, magnetic transducers are arranged at a distance of a few μm above both faces of the discs. The current practice usually is to associate a single platform provided with one or more transducers with each face of a disc. When it is desired to achieve a substantial reduction in the time taken by a transducer to access any item of data contained on the face in question, the platform is provided with a plurality of transducers. Typical magnetic platforms are illustrated and described in U.S. Pat. Nos. 3,723,665 and 3,846,847 and copending application Ser. No. 882,592 of Lazzari et al, filed Mar. 2, 1978, now U.S. Pat. No. 4,198,667, and assigned to the assignee of the present invention.

The transducers used are generally magnetic transducers which contain a magnetic circuit having an air gap and a winding arranged round it. The air-gap enables data to be read and written. Generally, but not exclusively, platforms incorporating one or more transducers are in the shape of a relatively shallow rectangular parallelepiped of which the major face, termed the lower face, which is adjacent the discs, contains the air gaps of the transducers, and of which the opposite major face, termed the upper face, contains the electrical terminals and wires which enable the windings of the transducers to be connected to the electrical circuits of the disc memory which are associated with them.

When the transducers of a platform are not performing the operation of reading or writing data from or on the corresponding face of the disc, the platform occupies a so-called "rest" position in relation to the disc which is different from the so-called read or write position.

The platforms are provided with a fitting which, as a whole, forms a device which will be referred to herein as a read and/or write head.

There are two main types of read/write heads. One is known as a "ramp-launched head" or "ramp-landed head", and the other is known as an "unstick from contact head".

"Ramp-landed heads" have long been known. They generally comprise: a platform incorporating at least one transducer, a member to carry the platform at one of its ends which takes the form of a substantially rectangular rigid strip, a rigid arm detachably secured to a carriage intended to move the platform above the disc, a loading spring formed by a substantially rectangular flexible strip, one side of which is fixed to the arm and the other side of which is fixed to the member carying the platform at the end of the said member opposite from that carrying the platform, and a means for controlling the position of the platform in relation to the data carrier. The latter means comprises a guide member made up of a level surface and a ramp and a pin which, when it cooperates with the level surface, holds the platform in its rest position and which, when it cooperates with the ramp, brings the platform to its reading/writing position. The level surface forms an extension, generally in the same plane, of the rigid strip carrying the platform. The ramp forms an extension of the level surface in an upwardly inclined plane, that is to say it extends away from the face of the disc.

Given that in this structure the rigid strip which is to carry the platform and to incorporate the position controlling means forms an extension of the loading spring, the platform necessarily carries a heavy loading. A typical value for this loading is in the order of 300 g. It is desirable, however, that the loading on the platform should be light.

Assuming that the disc rotates, typically, at 60 revolutions per second, and that, for reasons inherent in its manufacture, the surface of the disc contains unevenesses which pass in front of the platform at a frequency of 600 Hz, the platform needs to be capable of accepting severe acceleration in order to be able to follow the undulating surface of the disc. Since acceleration is the quotient of force divided by mass, it is possible to achieve high acceleration either by increasing the force or by reducing the mass. However, since the platform flies above the disc at the time of reading or writing as a result of the lifting effect of a cushion of air which exists between the lower face of the platform and the disc, force is a datum which cannot be altered. The problem is therefore to reduce the mass of the head. This being 300 g at the present time for typical structures, it would be desirable to reduce it to 15 g, that is to say to divide it by 20. Unfortunately, it is impossible to produce a landing head having so low a loading while still retaining a conventional structure as described above.

As another drawback of heavy loading, mention should be made of the sensitivity of such heads to the unwanted dust particles that the face of the disc may be carrying. In effect, the head is not sufficiently compliant to react to the presence of large particles which infiltrate between one of its air gaps and the disc. Such particles may act as magnetic shunts and adversely effect the quality of the detected signal and may also cause mechanical damage to the adjoining faces of the disc and the platform.

To overcome the disadvantages of ramp-landed heads, another type of head has been designed termed the "unstick from contact head". Such heads are illustrated and described in copending applications of Michel Plotto, Ser. Nos. 958,839 and 958,840, filed Nov. 8, 1978, now U.S. Pat. Nos. 4,225,891 and 4,212,044, respectively, and assigned to the assignee of the present invention. These new heads are being more and more widely used by reason of their low loading. The platforms for these heads have a lower major face termed the flight surface. The flight surface comprises a first part which is in the form of skids which rest on the disc when the latter is stationary and a second, bevelled part, which is inclined to the skids and which is situated at the front of the platform, the front being that part of the flight surface which, when the face of the magnetic disc associated with the platform is passing in front of the flight surface, is the first in time to have the data on this face of the disc pass before it. The air gaps of the transducers belonging to the platform are situated at the rear of the flight surface.

When it is desired to move the platform from its rest position to its flying position above the face of the disc which is associated with it, it is merely necessary to set the disc in rotation. After a fairly short time, the platform rises due to the lifting effect created by the bevel. When the disc reaches its nominal speed of rotation, the platform is in its flying position with the skids inclined relative to the face of the disc, which provides the platform with sufficient lift for it to fly stably above the disc. The platform is thus enabled to take off by the lift provided by the skids.

Platforms of this kind are carried by a weak leaf-spring, which, in the read or write position, also acts as an arm to guide the platform above the disc and to suspend it.

Despite the advantage which these platforms have by virtue of their being lightly loaded, their use is restricted by the following two principal drawbacks. Firstly, the platform for such a head has an unstick time and, although this time is only of the order of a few milliseconds, it does mean that after a number of take-offs the flight surface of the platform and the corresponding face of the disc deteriorate as a result of the wear on them caused by the mechanical friction between them. Secondly, replacing a disc poses far more problems than it does with ramp-launched heads. In effect, unstick from contact platforms have to be moved away from the disc and then, when the disc has been removed, they have to be held in a position where they cannot be damaged and finally, they have to be moved out of the way again while the new disc is being inserted and adjustments have to be made to ensure that they fly at the correct height.

In contradistinction, ramp-landed heads do not have these advantages inasmuch as the platform is fairly well spaced from the disc in the rest position thereby enabling easy disc replacement. When the disc is in place adjustment is relatively easy.

SUMMARY OF THE INVENTION

The object of the present invention is to provide a head which combines the advantages of both types of the aforenoted heads and which thus avoids the disadvantages inherent in both types.

The device according to the invention is a ramp lauched read/write head for a data carrier, of the kind comprising: an arm, a loading spring which has a part fixedly connected to the said arm, a platform incorporating at least one read/write transducer, a member to carry the platform, and a means for controlling the position of the platform in relation to the data carrier, comprising a guide member made up of a level surface and at least one ramp, and a means which cooperates with the said guide member to bring the platform to a first, so-called rest position or to a second position close to the data carrier to enable the latter to be read from or written on, the said device being characterized in that: the said member to carry the platform comprises, in essence, a suspension spring of which one end is fixedly connected to the said arm and of which the free end carries the platform; the said loading spring has a free end situated above the platform which is able to come into contact with the platform; and the said control means has its guide member flexibly connected to the said arm and includes the said free end of the loading spring, this end coming into contact with the said guide member in accordance with the said positions of the platform.

In the device which forms this head, the loading spring only comes into action when the data carrier is being read from or written on to apply to the platform the weak loading required to form a signal of good quality despite the presence of bumps or undulations on the disc and of dust on it.

BRIEF DESCRIPTION OF THE DRAWINGS

The features and advantages of the invention will be more clearly apparent from the following description, which is given with reference to the accompanying drawings.

In the drawings wherein like reference characters represent like parts throughout the several views:

FIG. 1 is a perspective view of a conventional ramp-launched head.

FIGS. 2 and 3 are schematic views from the side and from above, respectively, of a conventional unstick from contact head.

FIG. 5 is a sectional side elevational view of the head shown in FIG. 4 when cooperating with a disc, to illustrate the rest position of the platform in a head according to the invention. FIG. 5 may be read as a leftside view of the head as seen from FIG. 4.

FIG. 6 is a view similar to that shown in FIG. 5, but showing the platform in the read/write position, and FIG. 7 is a fragmentary front elevational section a plane containing line 7—7 illustrated on FIG. 6 and normal to arrow 53 when the platform is in its reading position.

DESCRIPTION OF THE PREFERRED EMBODIMENTS

Figure 4:
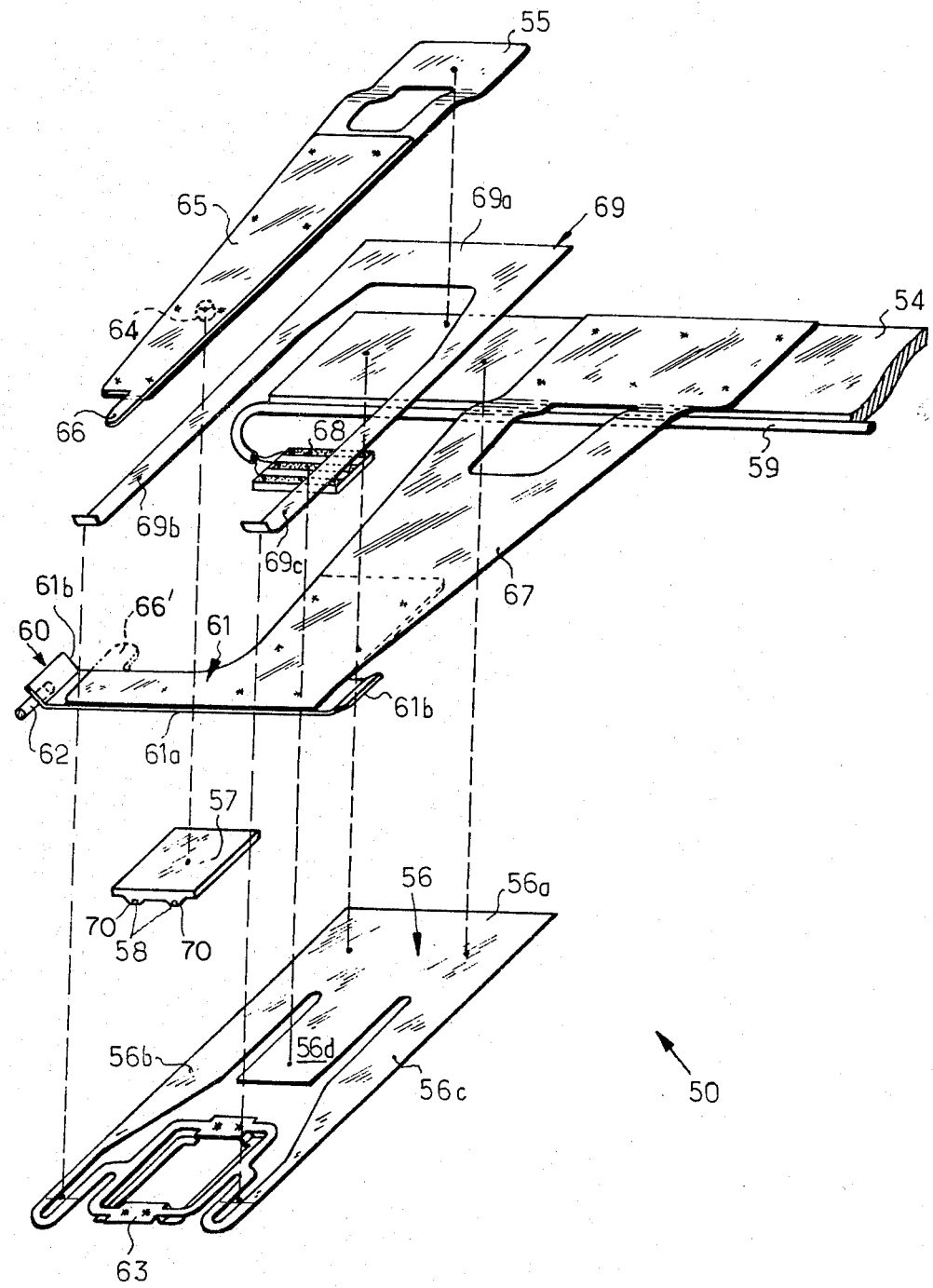
FIG. 4 is an exploded perspective view of an embodiment of a read/write head according to the present invention.

Before beginning to examine a read/write head according to the invention, the following description will first deal with typical embodiments of the two types of prior art reading heads referred to above.

FIG. 1 is a perspective view of a conventional ramp launched reading head, which is shown in association with a magnetic disc 11 provided with a large number of concentric tracks 12 on which data is recorded. In operation, the disc rotates in the direction of arrow 13.

The read/write head 10 comprises a rigid arm 14 having one end connected to a carriage (not shown) which is intended to shift the arm 14 above the disc 11 for the purpose of reading from a selected track 12a. The other end of arm 14 extends into a loading spring 15 in the form of a rectangular strip which is slightly concave when at rest. One of the long sides of spring 15 is connected to the arm 14, while its other long side is connected to the short side of a member 16 carrying a platform 17. The carrier member 16 is a substantially rectangular rigid strip which carries the platform 17 at its free end. In the form shown, the platform 17 has two skids 18 which form the main flight surface. A cable 19 is provided to carry the signal detected by the transducer or transducers carried by the platform 17. Finally, the head 10 is associated with a means 20 for controlling the position of the platform 17 in relation to the disc 11. This control means comprises a guide a guide member 21 made up of a level surface 21a and a ramp 21b, and a pin 22 which is able to cooperate with the level surface 21a and the ramp 21b. The pin 22 is in fact movable in a fixed direction XX' substantially parallel to the plane of arm 14.

Because of the loading spring 15, the carrier strip 16 forms an angle α with the plane of arm 14 which is able to be varied as a function of the movement of the pin 22 in direction X, X'. The loading spring 15 does in fact tend to force the platform 17 down towards the disc 11, this movement being controlled by the pin 22. Thus, when the pin 22, which is shown in association with the ramp 21b, moves in direction X, it forces the strip 16 to rise and the platform 17 to move away from the disc 11. If the pin moves in direction X', the ramp 21b causes the platform 17 to assume its flight position (termed the read position) above the disc 11. The platform 17 is in its rest position when the pin 22 is cooperating with the level surface 21a.

FIGS. 2 and 3 are schematic views, from the side and from above respectively, of an embodiment of head 30 which unsticks from contact with a disc 31. The head is shown in FIG. 2 in a free position above the disc to make the drawings easier to understand. The head 30 comprises: a rigid plinth 32 which rests against an arm 33 connected to a carriage (not shown) to guide the head 30 above the disc 31. A loading spring 34 is formed by a strip having an end region 34a connected to the plinth 32. Two side arms 34b, 34c run from the region 34a and terminate in the center of a short side of a substantially rectangular frame 34d. A tongue 34e extends between the arms 34b and 34c from region 34a. A platform 35 is provided within the frame 34d. A cable 36 translates the signal detected by the platform 25 to a data processing apparatus (not shown). A member 37 carries the platform 35 connected by a rigid strip part connected to the tongue 34e. A trough 38 is provided which extends into a prong 39 which carries the platform 35 at its free end. The trough 38 is used to hold the cable 36 in order to bring it to the plinth 32. The carrier member also has two lateral tabs 40 which bear against the two arms 34b and 34c of the loading spring 34.

When the disc 31 begins to turn, the platform 35, which is provided with an unstick bevel, moves away from the disc to fly above it at a height which is predetermined to suit the speed of rotation of the disc and the area of the lifting surface of the platform.

FIGS. 4 and 7 illustrate a preferred embodiment of read/write head according to the invention. This head is of the ramp launched or ramp-landed type and is an improvement over conventional heads of the type shown in FIG. 1.

The head 50 is shown in exploded perspective in FIG. 4, and in section in FIGS. 6 and 7 in association with a magnetic disc 51 provided with tracks 52. Disc 51 is driven in direction represented by arrow 53. Referring to FIGS. 4 and 7, it can be seen that the head 50 essentially comprises a rigid arm 54 connectible to a carriage (not shown), a loading spring 55 having one end fixedly connected to the arm 54, a member 56 to carry a platform 57, which platform is provided, as in FIG. 1, with two skids 58 and a cable 59 intended to translate the detected signal to a data processing apparatus (not shown), and means 60 for controlling the position of the platform 57 in relation to the disc 51. The latter control means comprise a guide member 61, made up of a level surface 61a and at least one ramp 61b, and a pin 62 which is intended to cooperate with the level surface or the ramp for the purposes of bringing platform 57 to its rest position or its read/write position.

The member 56 which carries the platform 57 is in essence a leaf suspension spring which is fixedly connected at one end to the rigid suspension arm 54 to overhang from it. The platform 57 is carried at its free end in a frame 63 which serves to locate and support the platform. The loading spring 55 is also fixedly mounted at one end on the arm 54 to overhang from it and its free end is situated above the platform 57 so as to be able to come into contact with the platform, via a protrusion which, in the embodiment shown, is a ball-bearing 64. Also in the embodiment shown, the free end of the loading spring 55 is reinforced by a stiff strip 65 which extends at the free end of the loading spring 55 in the form of a rigid prong 66. The platform position control means 60 for controlling the position of the platform 57, is distinguished from that of a conventional head by the fact that there is provided a guide member 61 made up of the level surface 61a and the two ramps 61b at opposite ends. Guide member 61 is connected to the rigid arm 54 by a web 67 which forms a spring. The guide member may be integral with the web 67 to form the free end of the web. In addition, the platform control means 60 according to the invention includes the free end of the loading spring 55, with which the guide member 61 cooperates, that is to say in the embodiment illustrated the prong 66.

The suspension spring 56 is made up of a base including an end region 56a which is fixedly connected to the underside of the arm 54 and which extends into two arms 56b, 56c which are substantially parallel to each other and which have their ends connected to the center parts of respective ones of the two opposite sides of the frame 63. To this end, the ends of arms 56b and 56c come back upon themselves, that is to say they are U-shaped at the free end and, as shown, are connected between the base and the frame at a median line thereof and on opposite sides thereof. The overall shape of the arms 56b and 56c and the points where they join the frame 63 are so designed that if pressure is applied to the platform 57 by the ball bearing 64, the frame dips while remaining substantially parallel to its original position. In the configuration shown in the drawings the arms bend through substantially 180° before joining the central areas of the appropriate sides of the frame. Other configurations are of course possible to achieve the desired result. Possibly, as shown, the region 56a may extend into an intermediate tongue 56d which is intended to carry a circuit 68 to provide a connection between the lead 59 and the transducers carried by platform 57, and shown diagrammatically at 70.

The head 50 also incorporates an ancillary member, namely an anti-vibration strip 69 which is shown in the form of a U-shaped member having a base region 69a fixedly connected to the top of arm 54 and two extending arms 69b, 69c intended to have their substantially free angled ends in position to bear against the end parts of arms 56b and 56c of the suspension spring 56. The function of this anti-vibration strip will be described with reference to FIGS. 5 and 7. Firstly, however, the operation of a head 50 according to the invention will be described with reference to those latter figures.

FIG. 5 shows the head 50 in its rest position and FIG. 6 shows it in the read/write position. In the read/write position, the pin 62 is in contact with the top part of one of the ramps 61b and the level surface 61a is thus situated in a lowered position relative to the disc 51. In this position, the loading spring 55 is so designed that its free end 66 does not come into contact with the level surface 61a. In this way, the spring is capable of acting without hindrance on the platform 57. In addition, the loading spring 55 may apply only a small loading to a head according to the invention.

To set the platform 57 to its rest position, the pin 62 is moved forward to come under the level surface 61a. The effect of this is to lift the level surface and, as it moves, to lift the loading spring 55 via the prong 66. By virtue of the effect of the suspension spring 56, the platform rises. In its rest position, it may or may not be in contact with the ball-bearing.

FIG. 7 shows the effect of the anti-vibration strip 69. In fact, while the platform 57 is being moved into position, it may be caused to vibrate and to perform a rolling movement. Given the small height at which the skids are located relative to the disc (some 10 μm), this roll is extremely disadvantageous. By means of the anti-vibration spring the rolling is very much damped.

Various modifications may be made to the embodiment which has just been described. The prong 66 could for example very well project from the level surface 61a rather than from the end of the loading spring 55. This is indicated in chain lines at 66'. Also, the ball-bearing 64 could be carried by the platform.

Similarly, the platform may be carried by some carrier member other than the frame employed in the above embodiment.

In other words, it is not intended to restrict the invention to the embodiment described and illustrated inasmuch as the invention may employ various means which form technical equivalents of the means described, as well as combinations of these which may come within the true scope of the invention as defined by the following claims.

I claim:

1. A ramp-launched read/write device (50) for a data carrier comprising: an arm (54), a loading spring (55) having one end fixedly connected to the said arm (54) and a free end part (66), a platform (57) incorporating at least one read/write transducer, a carrier means (56) for carrying the platform, said carrier means comprising a suspension spring (56) having one end (56a) fixedly connected to the said arm (54) and a free end (63) for locating and supporting the platform (57), spring means (60, 65, 67, 69) for controlling the position of the platform (57) in relation to the data carrier (51), said controlling means (60, 65, 67) comprising a guide member having a level surface (61a) and at least one ramp surface (61b), and means (62) adapted to cooperate with the said guide member (61) for moving the platfrom (57) between a first, rest position and a second, read/write position close to the data carrier (51) to allow the data carrier (51) to be read from or written on, said controlling means (60, 65, 67) having said guide member (61) fixedly but flexibly connected to the said arm (54), the said free end part (66) of the loading spring contacting the said guide member (61) in accordance with the said positions of the platform (50) and anti-vibration means comprising a spring (69) having one end (61a) fixedly connected to the said arm (54) and a free end (60b, 69c) resting against the free end (63) of the suspension spring (56) of said carrier means for minimizing vibration of said platfrom.

2. A read/write device according to claim 1 wherein the free end of said suspension spring includes two arms (56b, 56c) interconnected to enable the platform to move between the said first and second positions while remaining parallel to itself.

3. A read/write device according to claim 2, including a frame (63) connected between said two arms (56b, 56c) and enclosing the platform, said arms being substantially parallel, said frame being carried by the two substantially parallel arms, said arms having their ends connected to the center parts of respective ones of two opposed sides of the frame.

4. A read/write device according to claim 3, wherein the parallel arms bend through approximately 180° and are substantially U-shaped at their ends.

5. A read/write device according to claim 1 wherein the carrier means (56) includes a tongue (56d) for supporting an intermediate connection between the platform (57) and a cable (59) adapted to be connected for tranlating a data signal.

6. A read/write device according to claim 1 wherein said loading spring includes prong means (66) extending from its free end part and being disposed adjacent said level surface (61a) such that the free end of the loading spring (55) is arranged to make contact with said level surface.

7. A read/write device according to claims 2, 3 or 6, wherein the carrier means (56) includes a tongue (56d) for supporting an intermediate connection between the platform (57) and a cable (59) adapted to be connected for translating the data signal.

8. A read/write device according to claim 2, 3 or 5, wherein said loading spring includes prong means (66) extending from its free end and being disposed adjacent said level surface (61a) such that the free end of the loading spring (55) is arranged to make contact with the level surface (61a).

* * * * *

UNITED STATES PATENT AND TRADEMARK OFFICE
CERTIFICATE OF CORRECTION

PATENT NO. : 4,280,156
DATED : July 21, 1981
INVENTOR(S) : Jean Vilette

It is certified that error appears in the above-identified patent and that said Letters Patent are hereby corrected as shown below:

Column 8, line 4 after "the" (second occurrence) omit --platfrom-- and insert "platform".

Column 8, line 17 after "said" omit --platfrom-- and insert "platform".

Signed and Sealed this

Eighth Day of December 1981

[SEAL]

Attest:

Attesting Officer

GERALD J. MOSSINGHOFF

Commissioner of Patents and Trademarks